United States Patent
Harris et al.

(10) Patent No.: US 8,494,993 B2
(45) Date of Patent: Jul. 23, 2013

(54) SYSTEMS AND METHODS FOR QUANTUM COMPUTATION USING REAL PHYSICAL HARDWARE

(75) Inventors: Richard G. Harris, North Vancouver (CA); Geordie Rose, Vancouver (CA); Kamran Karimi, Burnaby (CA)

(73) Assignee: D-Wave Systems Inc., Burnaby (CA)

( * ) Notice: Subject to any disclaimer, the term of this patent is extended or adjusted under 35 U.S.C. 154(b) by 257 days.

(21) Appl. No.: 12/992,057

(22) PCT Filed: Jun. 23, 2010

(86) PCT No.: PCT/US2010/039643
§ 371 (c)(1),
(2), (4) Date: Nov. 10, 2010

(87) PCT Pub. No.: WO2010/151581
PCT Pub. Date: Dec. 29, 2010

(65) Prior Publication Data
US 2012/0023053 A1    Jan. 26, 2012

Related U.S. Application Data

(60) Provisional application No. 61/220,860, filed on Jun. 26, 2009, provisional application No. 61/239,917, filed on Sep. 4, 2009.

(51) Int. Cl.
*G06F 17/00* (2006.01)
*G06N 5/00* (2006.01)
(52) U.S. Cl.
USPC .......................................................... 706/45
(58) Field of Classification Search
USPC .......................................................... 706/45
See application file for complete search history.

(56) References Cited

U.S. PATENT DOCUMENTS

| | | | |
|---|---|---|---|
| 7,135,701 B2 | 11/2006 | Amin et al. | 257/31 |
| 7,533,067 B2 * | 5/2009 | Beckstrom et al. | 705/402 |
| 7,533,068 B2 | 5/2009 | Maassen van den Brink et al. | 706/10 |

(Continued)

FOREIGN PATENT DOCUMENTS

WO    2009/120638    10/2009

OTHER PUBLICATIONS

International Search Report, mailed Feb. 23, 2011, for PCT/US2010/039643, 3 pages.

(Continued)

*Primary Examiner* — Michael B Holmes
(74) *Attorney, Agent, or Firm* — Seed IP Law Group PLLC

(57) ABSTRACT

Iterative approaches to quantum computation are described. Incongruities in the behavior of the various individual elements in a quantum processor may be managed by establishing a set of equivalent configurations for the elements of the quantum processor. The quantum processor is programmed and operated using each equivalent configuration to determine a set of solutions. The solutions are evaluated to determine a preferred solution that best satisfies at least one criterion. Furthermore, thermodynamic effects from operating a quantum processor at non-absolute zero temperature can cause the ground state to be the most probable state into which the system will settle. By running multiple iterations the ground state may be identified as the state with the most frequent reoccurrences. Alternatively, the energy of each unique state may be calculated and the state that corresponds to the lowest energy may be returned as the solution to the problem.

35 Claims, 8 Drawing Sheets

U.S. PATENT DOCUMENTS

| | | | |
|---|---|---|---|
| 7,870,087 B2 * | 1/2011 | Macready et al. | 706/62 |
| 7,877,333 B2 * | 1/2011 | Macready | 706/10 |
| 7,899,852 B2 * | 3/2011 | Amin | 708/2 |
| 8,008,942 B2 * | 8/2011 | van den Brink et al. | 326/4 |
| 8,032,474 B2 * | 10/2011 | Macready et al. | 706/46 |
| 8,073,808 B2 * | 12/2011 | Rose | 706/62 |
| 8,175,995 B2 * | 5/2012 | Amin | 706/45 |
| 8,195,596 B2 * | 6/2012 | Rose et al. | 706/62 |
| 8,195,726 B2 * | 6/2012 | Macready et al. | 708/1 |
| 8,229,863 B2 * | 7/2012 | Amin et al. | 706/10 |
| 8,244,650 B2 * | 8/2012 | Rose | 706/13 |
| 8,244,662 B2 * | 8/2012 | Coury et al. | 706/46 |
| 2007/0174227 A1 | 7/2007 | Johnson et al. | 706/62 |
| 2008/0109500 A1 | 5/2008 | Macready et al. | 708/2 |
| 2008/0176750 A1 | 7/2008 | Rose et al. | 505/170 |
| 2008/0215850 A1 | 9/2008 | Berkley et al. | 712/1 |
| 2008/0313114 A1 | 12/2008 | Rose | 706/13 |
| 2008/0313430 A1 | 12/2008 | Bunyk | 712/34 |
| 2009/0121215 A1 | 5/2009 | Choi | 257/31 |

OTHER PUBLICATIONS

Written Opinion, mailed Feb. 23, 2011, for PCT/US2010/039643, 6 pages.

* cited by examiner

SYSTEMS AND METHODS FOR QUANTUM COMPUTATION USING REAL PHYSICAL HARDWARE

CROSS REFERENCE TO RELATED APPLICATIONS

This application is a U.S. national stage application filed under 35 U.S.C. §371 of International Patent Application PCT/US2010/039643, accorded an international filing date of Jun. 23, 2010 which claims benefit under 35 U.S.C. 119(e) of U.S. Provisional Patent Application Ser. No. 61/220,860, filed Jun. 26, 2009 and entitled "Systems and Methods for Realizing Fault Tolerance in Physical Quantum Computing Hardware," and U.S. Provisional Patent Application Ser. No. 61/239,917, filed Sep. 4, 2009 and entitled "Systems and Methods for Adiabatic Quantum Computation in the Presence of Non-Absolute Zero Temperature," each of which is incorporated herein by reference in its entirety.

BACKGROUND

Field

The present systems and methods generally relate to quantum computation and specifically relate to superconducting quantum computation and implementations of adiabatic quantum computation and/or quantum annealing.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems and methods are described in US Patent Publication No. 2006-0225165 (now U.S. Pat. No. 7,533,068), US Patent Publication 2008-0176750, U.S. patent application Ser. No. 12/266,378 published as U.S. Patent Publication 2009-0121215, and PCT Patent Application Ser. No. PCT/US09/37984 published as PCT Patent Publication 2009-120638.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ of the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s} |\langle 1 | dH_e/ds | 0 \rangle | = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

To date, the development of adiabatic quantum computation has mostly been restricted to an idealized model in absolute zero temperature. In accordance with an aspect of the present systems and methods, the practical implementation of a physical adiabatic quantum processor in the presence of non-absolute zero temperature may cause the operation of the system to stray away from the idealized model.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF SUMMARY

A method of using a quantum processor to determine a solution to a problem, wherein the quantum processor includes a plurality of elements, may be summarized as generating a representation of the problem using a first computer processor; programming the elements of the quantum processor in a first configuration that embodies the representation of the problem; operating the quantum processor in the first configuration to determine a first solution to the problem; storing the first solution to the problem; programming the elements of the quantum processor in a second configuration that embodies the representation of the problem, wherein the second configuration is different from the first configuration such that at least one element of the quantum processor is programmed differently in the second configuration compared to the first configuration; and operating the quantum processor in the second configuration to determine a second solution to the problem. Operating the quantum processor may include performing at least one of an adiabatic quantum computation and an implementation of quantum annealing. Programming the elements of the quantum processor in a second configuration may include programming the quantum processor in the second configuration that is at least one of a rotation of the first configuration or a reflection of the first configuration.

In some embodiments, the method may include determining a first preferred solution to the problem by comparing the second solution to the first solution, wherein the first preferred solution to the problem includes the one of the first solution and the second solution that best satisfies at least one criterion. In such embodiments, the method may include storing the first preferred solution to the problem; programming the elements of the quantum processor in at least one additional configuration that embodies the representation of the problem, wherein the at least one additional configuration is different from both the first configuration and the second configuration such that at least one element of the quantum processor is programmed differently in the at least one additional configuration compared to both the first configuration and the second configuration; operating the quantum processor in the at least one additional configuration to determine at least one additional solution to the problem; and determining a second preferred solution to the problem by comparing the at least one additional solution to the first preferred solution, wherein the second preferred solution to the problem includes the one of the at least one additional solution and the first preferred solution that best satisfies at least one criterion.

In some embodiments, the method may include storing the second solution to the problem; programming the elements of the quantum processor in at least one additional configuration that embodies the representation of the problem, wherein the at least one additional configuration is different from both the first configuration and the second configuration such that at least one element of the quantum processor is programmed differently in the at least one additional configuration compared to both the first configuration and the second configuration; and operating the quantum processor in the at least one additional configuration to determine at least one additional solution to the problem. In such embodiments, the method may include determining a preferred solution to the problem by comparing the first solution, the second solution, and the at least one additional solution, wherein the preferred solution to the problem includes the one of the first solution, the second solution, and the at least one additional solution that best satisfies at least one criterion.

A processor system may be summarized as including a quantum processor comprising a plurality of elements; an operational subsystem including a plurality of programming interfaces operable to program the plurality of elements, the operational subsystem configured to program the plurality of elements of the quantum processor in a first configuration that embodies a problem, operate the quantum processor in the first configuration to determine a first solution to the problem, program the plurality of elements of the quantum processor in a second configuration that embodies the problem, wherein the second configuration is different from the first configuration such that at least one element of the quantum processor is programmed differently in the second configuration compared to the first configuration, and operate the quantum processor in the second configuration to determine a second solution to the problem; and a read out subsystem configured to read out the first solution to the problem, store the first solution to the problem, and read out the second solution to the problem. The quantum processor may include a superconducting quantum processor and at least one element may be selected from the group consisting of a superconducting flux qubit, a superconducting charge qubit, a superconducting phase qubit, and a superconducting coupler.

A method of operating a quantum processor may be summarized as programming the quantum processor in a first configuration that embodies a problem; performing a first quantum computation using the quantum processor in the first configuration to determine a first solution to the problem; storing the first solution to the problem; programming the quantum processor in a second configuration that embodies the problem, wherein the second configuration is different from the first configuration; and performing a second quantum computation using the quantum processor in the second configuration to determine a second solution to the problem. Performing a first quantum computation may include performing at least one of an adiabatic quantum computation and an implementation of quantum annealing, and performing a second quantum computation may include performing at least one of an adiabatic quantum computation and an implementation of quantum annealing. Programming the quantum processor in a second configuration that embodies the problem may include programming the quantum processor in the second configuration that is at least one of a rotation of the first configuration or a reflection of the first configuration.

In some embodiments, the method may include determining a first preferred solution to the problem by comparing the second solution to the first solution, wherein the first preferred solution to the problem includes the one of the first solution and the second solution that best satisfies at least one criterion. IN such embodiments, the method may include storing the first preferred solution to the problem; programming the quantum processor in at least one additional configuration that embodies the problem, wherein the at least one additional configuration is different from both the first configuration and the second configuration; performing at least one additional quantum computation using the quantum processor in the at least one additional configuration to determine at least one additional solution to the problem; and determining a second preferred solution to the problem by comparing the at least one additional solution to the first preferred solution, wherein the second preferred solution to the problem includes the one of the at least one additional solution and the first preferred solution that best satisfies at least one criterion.

In some embodiments, the method may include storing the second solution to the problem; programming the quantum processor in at least one additional configuration that embodies the problem, wherein the at least one additional configuration is different from both the first configuration and the second configuration; and performing at least one additional quantum computation using the quantum processor in the at least one additional configuration to determine at least one additional solution to the problem. In such embodiments, the method may include determining a preferred solution to the problem by comparing the first solution; the second solution, and the at least one additional solution, wherein the preferred solution to the problem includes the one of the first solution, the second solution, and the at least one additional solution that best satisfies at least one criterion.

A processor system may be summarized as including a quantum processor; an operational subsystem including a plurality of programming interfaces operable to program the quantum processor, the operational subsystem configured to program the quantum processor in a first configuration that embodies a problem, perform a first quantum computation using the quantum processor in the first configuration to determine a first solution to the problem, program the quantum processor in a second configuration that embodies the problem, wherein the second configuration is different from the first configuration, and perform a second quantum computation using the quantum processor in the second configuration to determine a second solution to the problem; and a read out subsystem configured to read out the first solution to the problem, store the first solution to the problem, and read out the second solution to the problem. The quantum processor may include a superconducting quantum processor having at least one element selected from the group consisting of a superconducting flux qubit, a superconducting charge qubit, a superconducting phase qubit, and a superconducting coupler.

A method of using a quantum processor to determine a solution to a problem, wherein the quantum processor includes a plurality of elements, may be summarized as determining a set of at least two equivalent configurations for the elements of the quantum processor, wherein each configuration in the set of equivalent configurations represents the problem; and for each respective configuration: programming the elements of the quantum processor in the configuration; operating the quantum processor in the configuration to determine a solution to the problem; and storing the solution to the problem. In some embodiments, the method may include determining a preferred solution to the problem, wherein the preferred solution includes the solution that best satisfies at least one criterion. Operating the quantum processor may include performing at least one of an adiabatic quantum computation and an implementation of quantum annealing.

A processor system may be summarized as including a quantum processor comprising a plurality of elements; an operational subsystem including a plurality of programming interfaces operable to program the plurality of elements, the operational subsystem configured to iteratively operate the quantum processor by, for each iteration, programming the elements of the quantum processor in a respective configuration from a set of equivalent configurations that represent a problem, and performing a quantum computation to determine a respective solution to the problem corresponding to each respective configuration; and a read out subsystem configured to read out and store each respective solution to the problem. The quantum processor may include a superconducting quantum processor having at least one element selected from the group consisting of a superconducting flux qubit, a superconducting charge qubit, a superconducting phase qubit, and a superconducting coupler.

A method for solving a problem using a quantum system that includes a plurality of qubits may be summarized as including A) initializing the quantum system in a first configuration embodying an initialization Hamiltonian $H_i$; B) evolving the quantum system until the quantum system is described by a second configuration embodying a problem Hamiltonian $H_P$; C) reading out a state of the quantum system; D) storing the state of the quantum system in a computer-readable medium; E) repeating acts A) through D) at least N times, where N>1, to produce a set of N stored states, wherein at least two of the stored states in the set of N stored states are identical to one another such that the set of N stored states consists of M unique states, where M<N; F) identifying a state that occurs most frequently among the set of N stored states by a computer processor; and G) returning the state that occurs most frequently as a solution to the problem.

The method may further include generating a probability distribution describing the number of occurrences of each of the M unique states in the set of N stored states by the computer processor, wherein identifying a state that occurs most frequently among the set of N stored states includes identifying a state having a highest probability in the probability distribution. The problem Hamiltonian $H_P$ may include a ground state, and wherein the state that occurs most frequently among the set of N stored states may correspond to the ground state. The quantum system may include evolving the quantum system at a non-absolute zero temperature T, and wherein the problem Hamiltonian $H_P$ includes a ground state having an energy $E_G$ and a set of excited energy states each having a respective energy $E_X$ in the range $E_G<E_X<E_G+100k_BT$, and wherein the state that occurs most frequently among the set of N stored states may correspond to one of the excited energy states from the set of excited energy states. Evolving the quantum system may include evolving the quantum system at a non-absolute zero temperature T, and wherein the problem Hamiltonian $H_P$ may include a ground state having an energy $E_G$ and a set of excited energy states each having a respective energy $E_X$ in range $E_G<E_X<E_G+3k_BT$, and wherein the state that occurs most frequently among the set of N stored states may correspond to one of the excited energy states from the set of excited energy states. The problem Hamiltonian $H_P$ may include a ground state, a first excited state, and a second excited state, and wherein the state that occurs most frequently among the set of N stored states may correspond to one of the ground state, the first excited state, and the second excited state. Evolving the quantum system until the quantum system may be described by a second configuration embodying a problem Hamiltonian $H_P$ includes evolving the quantum system until the quantum system may be described by one of a plurality of second configurations, wherein each second configuration in the plurality of second configurations may represent a different embodiment of the same problem Hamiltonian $H_P$.

A problem-solving system may be summarized as including a quantum processor comprising a plurality of elements; an operational subsystem including a plurality of programming interfaces operable to program the plurality of elements, the operational subsystem configured to: initialize the quantum processor in a first configuration embodying an initialization Hamiltonian $H_i$; evolve the quantum processor until the quantum system is described by a second configuration embodying a problem Hamiltonian $H_P$; and repeat the initialization and evolution of the quantum processor for at least N iterations, where N>1; a read out subsystem configured to read out a state of the quantum processor in a second configuration for each of the N iterations; and a computer processor configured to: store the state of the quantum processor for each of the N iterations, thereby producing a set of N stored states, wherein at least two stored states in the set of N stored states are identical to one another such that the set of N stored states consists of M unique states, where M<N; identify a state that occurs most frequently among the set of N stored states; and return the state that occurs most frequently. The quantum processor may a superconducting quantum processor comprising superconducting qubits.

A method for solving a problem using a quantum system comprising a plurality of qubits may be summarized as including initializing the quantum system in a first configuration embodying an initialization Hamiltonian $H_i$; evolving the quantum system until it is described by a second configuration embodying a problem Hamiltonian $H_P$; reading out a state of the quantum system; storing the state of the quantum system in a computer-readable medium; repeating the initializing the quantum system, the evolving the quantum system, the reading out the state of the quantum system and the storing the state of the quantum system at least N times, where N>1, thereby producing a set of N stored states, of which at least M are unique states, where M≦N; evaluating a respective energy corresponding to each of the M unique states using a computer processor; identifying a state that has a lowest corresponding energy among the M unique states; and returning the state that has the lowest corresponding energy as a solution to the problem. The problem Hamiltonian $H_P$ may include a ground state, and wherein the state that has the lowest corresponding energy among the M unique states corresponds to the ground state. Evolving the quantum system may include evolving the quantum system at a non-absolute zero temperature T, and wherein the problem Hamiltonian $H_P$ may include a ground state having an energy $E_G$ and a set of excited energy states each having a respective energy $E_X$ in the range $E_G<E_X<E_G+100k_BT$, and wherein the state that has the lowest corresponding energy among the M unique states may correspond to one of the excited energy states from the set of excited energy states. Evolving the quantum system may include evolving the quantum system at a non-absolute zero temperature T, and wherein the problem Hamiltonian $H_P$ may include a ground state having an energy $E_G$ and a set of excited energy states each having a respective energy $E_X$ in the range $E_G<E_X<E_G+3k_BT$, and wherein the state that has the lowest corresponding energy among the M unique states may correspond to one of the excited energy states from the set of excited energy states. The problem Hamiltonian $H_P$ may include a ground state, a first excited state, and a second excited state; and wherein that state that has the lowest corresponding energy among the M unique states may correspond to one of the ground state, the first excited state, and the second excited state. Evolving the quantum system until the quantum system may be described by a second configuration embodying a problem Hamiltonian $H_P$ includes evolving the quantum system until it may be described by one of a plurality of second configurations, wherein each second configuration in the plurality of second configurations may represent a different embodiment of the same problem Hamiltonian $H_P$.

A problem-solving system may be summarized as including a quantum processor comprising a plurality of elements; an operational subsystem including a plurality of programming interfaces operable to program the plurality of elements, the operational subsystem configured to: initialize the quantum processor in a first configuration embodying an initialization Hamiltonian $H_i$; evolve the quantum processor until it is described by a second configuration embodying a problem Hamiltonian $H_P$; and repeat the initialization and evolution of the quantum system for at least N iterations, where N>1; a read out subsystem configured to read out a state of the quantum processor in a second configuration for each of the N iterations; and a computer processor configured to: store the state of the quantum processor for each of the N iterations, thereby producing a set of N stored states, of which at least M are unique states, where M≦N; evaluate a respective energy corresponding to each of the M unique states; identify a state that has a lowest corresponding energy among the M unique states; and return the state that has the lowest corresponding energy.

The quantum processor may be a superconducting quantum processor comprising superconducting qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Fur- FIG. 1 is a schematic diagram of an exemplary quantum processor that is programmed in a first configuration.

DETAILED DESCRIPTION

Figure 1:
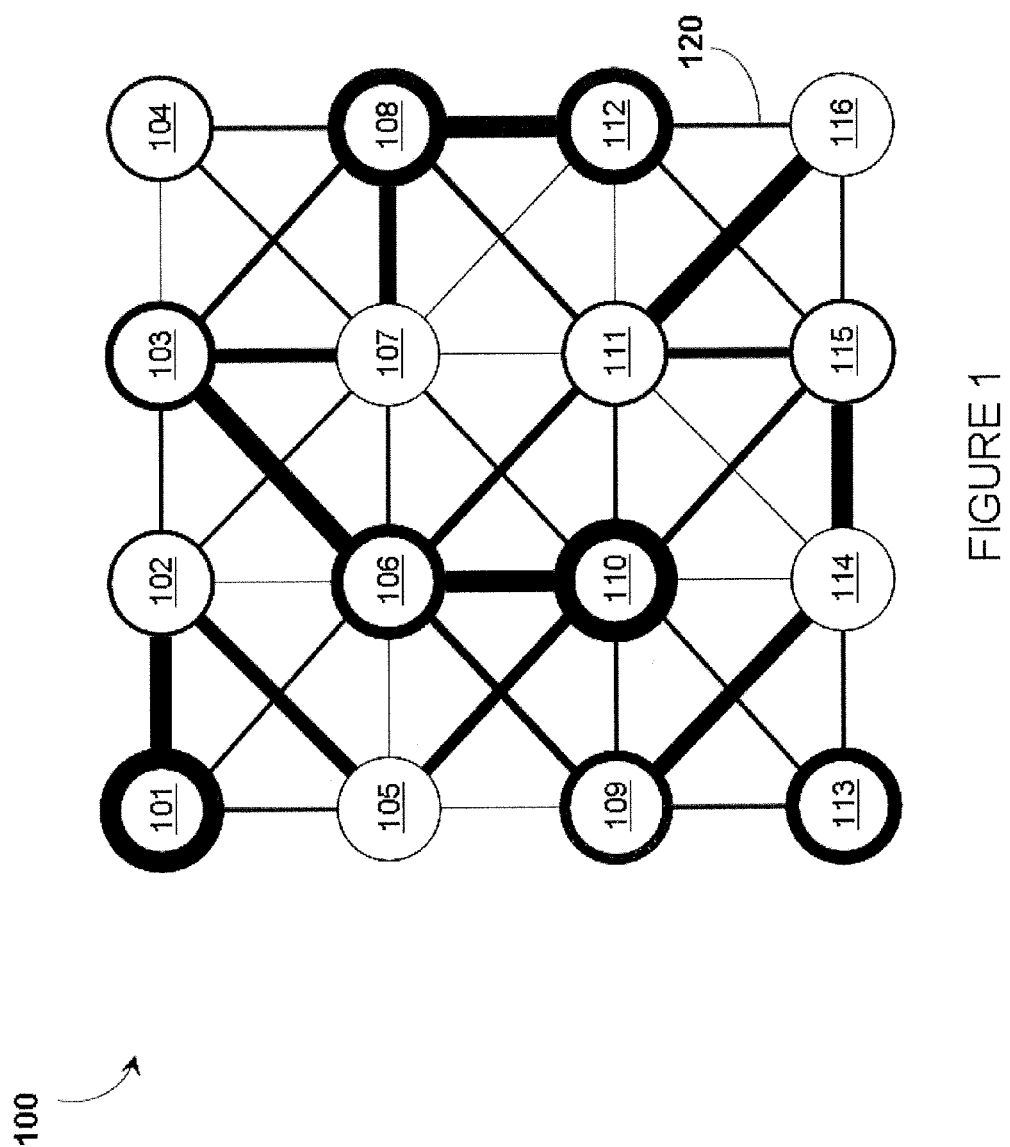

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" generally employed in its sense including "and/or" unless the content clearly dictates otherwise.

The headings provided herein are for convenience only and do not interpret the scope or meaning of the embodiments.

In accordance with an aspect of the present systems and methods, new techniques for realizing fault tolerance in physical quantum computing hardware are described. These techniques are based on the fact that in real physical quantum computing hardware discrepancies exist between devices that are otherwise generally conceived of as being identical. Such discrepancies can influence the operation of a quantum processor by causing incongruent elements (e.g., incongruent qubits and/or incongruent couplers) to behave in different ways from one another and/or from expected. Throughout this specification, the term "incongruent" is often used to describe an element, or a pair or a set of elements, of a quantum processor. This term is used to denote an element, or a pair or a set of elements, for which parametric, physical, and/or environmental discrepancies exist such that the element does not behave as expected, or the pair or set of elements do not behave identically to one another. In common conceptions of quantum computing hardware, all elements of the same type (e.g., all qubits and all couplers, etc.) are typically treated as being nominally identical. However, in practice all elements of the same type in a real physical quantum processor may not be identical. For example, non-uniformities and/or variations in the processes used to fabricate the elements of a quantum processor can produce incongruent elements. Similarly, non-uniformities in the environment of the quantum processor, such as gradients in temperature and/or magnetic field, as well as localized sources of noise, can cause at least some of the elements of a quantum processor to be incongruent.

Many different approaches to quantum computing exist, including but not limited to: gate model quantum computing, circuit model quantum computing, adiabatic quantum computing, quantum annealing, topological quantum computing, and cluster-state quantum computing. Regardless of the specific approach employed, a quantum processor may generally be used to determine a solution to a computational problem by programming the elements of the quantum processor in a configuration that encodes or represents the problem and evolving the elements of the quantum processor to provide a solution to the problem. Programming the elements of a quantum processor in a configuration that encodes or represents a problem typically involves encoding information in each respective element of the quantum processor. For example, programming the elements of a quantum processor in a configuration that encodes or represents a problem may involve encoding information in each respective qubit and encoding information in each respective coupler to effect relationships between various pairs, sets, and/or subsets of coupled qubits. Throughout this specification and the appended claims, the term "configuration" is often used to describe a programmed state of a quantum processor and/or a programmed state of the elements of a quantum processor. This term is used to denote a particular assignment of programmed information among the elements of a quantum processor. Thus, in a first configuration each element (e.g., each qubit and each coupler) in a quantum processor may be programmed to encode a first respective piece of information, and in a second configuration each element may be programmed to encode a second respective piece Of information. In some embodiments, a second configuration may differ from a first configuration in that a second piece of information encoded in at least one element of the quantum processor in the second configuration is different from a first piece of information encoded in the same element in the first configuration.

FIG. 1 shows an exemplary quantum processor 100 that is programmed in a first configuration. Quantum processor 100 includes sixteen qubits 101-116 and forty-two couplers 120 (only one called out in the Figure) arranged in a nearest-neighbor plus next-nearest-neighbor coupling lattice architecture. The information encoded in the first configuration of quantum processor 100 is represented by the relative linewidths used to illustrate each qubit 101-116 and each coupler 120 in the Figure. For example, the first configuration of quantum processor 100 has qubit 101 programmed to encode information that corresponds to a thick line-width and coupled, by a relationship corresponding to a thick line-width, to qubit 102 which is itself programmed to encode information that corresponds to a relatively thin line-width. In a similar way, each element (i.e., each qubit 101-116 and each coupler 120) in quantum processor 100 is programmed to encode information consistent with the illustrated first configuration.

Those of skill in the art will appreciate that a quantum processor may comprise any number of elements (e.g., any number of qubits and any number of couplers) arranged according to any coupling architecture. The number and architecture of elements depicted in quantum processor 100 are used for illustrative purposes only and are in no way intended to limit the scope of the present systems and methods.

The first configuration of quantum processor 100 may, for example, encode or represent a computational problem for which a solution is desired. Such a configuration may be programmed using an operational subsystem of quantum processor 100 which may, for example, include element-specific programming interfaces and a local memory administration system in accordance with US Patent Publication 2008-0215850. The translation between a configuration of quantum processor 100 and a computational problem may be generated using a computer processor, such as a classical digital computer processor. The classical digital computer processor may be used to generate a representation of the problem that maps to the quantum processor, such as a graphical representation, a binary representation, a quadratic unconstrained binary optimization representation, an Ising model representation, and the like.

In accordance with the present systems and methods, multiple equivalent configurations of a quantum processor may be used to represent the same computational problem. Throughout this specification and the appended claims, the term "equivalent" is used to describe a pair or a set of different configurations that describe the same problem. For example, if a first configuration of the elements of a quantum processor and a second configuration of the elements of a quantum processor both describe the same problem, then the two configurations are said to be "equivalent configurations." The fact that equivalent configurations exist for any given problem is well understood in the art and is of little value to theoreticians who assume that all the elements in a quantum processor are nominally identical. However, the idea that equivalent configurations can be used to realize a degree of fault tolerance in quantum computing becomes apparent when real physical quantum computing hardware is studied.

In general, most theoretical conceptions of quantum computing assume that all of the processor elements of the same type (e.g., all of the qubits and all of the couplers, etc.) behave nominally identically to one another. If this were indeed the case, then equivalent configurations of the quantum processor would produce equivalent solutions when a quantum computation is performed. In practice, however, incongruent elements exist in physical quantum computing hardware and these incongruent elements can cause discrepancies between the solutions produced by equivalent configurations of the quantum processor. In accordance with the present systems and methods, a degree of fault tolerance may be realized in quantum computation by iteratively operating a quantum processor with each iteration implementing a respective one of a plurality of equivalent configurations.

Figure 2:
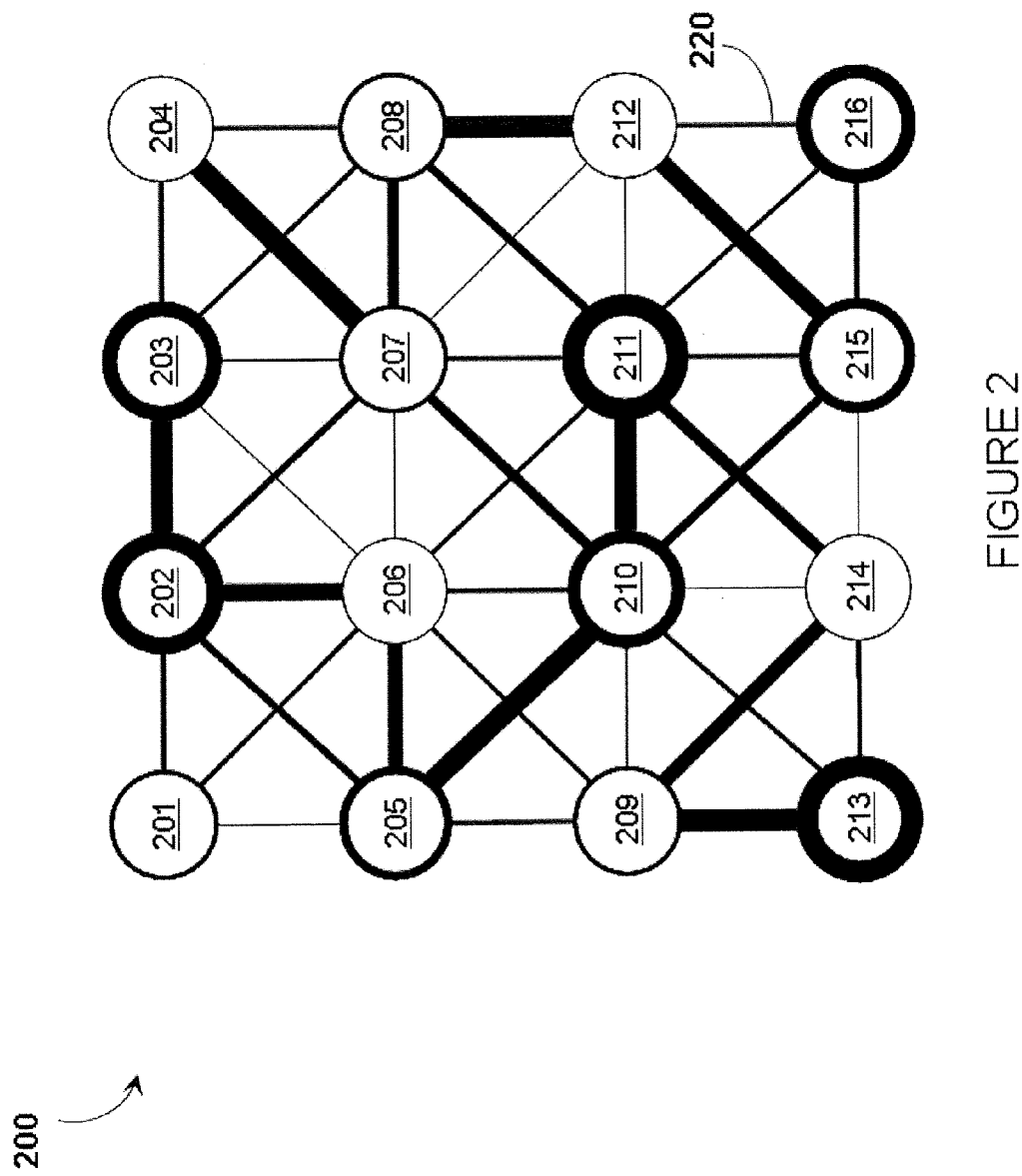
FIG. 2 is a schematic diagram of an exemplary quantum processor that is programmed in a second configuration in accordance with the present systems and methods.

FIG. 2 shows an exemplary quantum processor 200 that is programmed in a second configuration. Quantum processor 200 includes sixteen qubits 201-216 and forty-two couplers 220 (only one called out in the Figure) arranged in a nearest-neighbor plus next-nearest-neighbor coupling lattice architecture. Quantum processor 200 is substantially similar to quantum processor 100 from FIG. 1; the only difference being the quantum processor 200 is programmed in a second configuration while quantum processor 100 is programmed in a first configuration. In accordance with the present systems and methods, the first configuration shown in FIG. 1 and the second configuration shown in FIG. 2 are equivalent configurations of the same problem. Specifically, the second configuration illustrated in FIG. 2 embodies the first configuration of FIG. 1 rotated counter-clockwise by 90°, such that the information encoded in qubit 101 in the first configuration of FIG. 1 is encoded in qubit 213 in the second configuration of FIG. 2, and so on. A counter-clockwise rotation of 90° is used here to illustrate how a first configuration and a second configuration may be equivalent to one another. Those of skill in the art will appreciate that similarly equivalent configurations may be achieved with the illustrated processor architecture using counter-clockwise rotations of 180° and 270°, or clockwise rotations of 90°, 180°, and 270°. Furthermore, different processor architectures may realize equivalent configurations by different degrees and/or directions of rotation.

If all of the qubits (qubits 101-116 and 201-216) in the quantum processor (quantum processors 100 and 200, respectively) behaved nominally identically to one another, then one would expect the second configuration illustrated in FIG. 2 to produce the same solution as the first configuration illustrated in FIG. 1. However, if at least one qubit (or, similarly, at least one coupler) in the quantum processor is incongruent then the solution produced using the second configuration may differ from the solution produced using the first configuration. For example, if qubits 101 and 102 in quantum processor 100 (corresponding to qubits 201 and 202 in quantum processor 200) are incongruent with one another, then respectively programming these two qubits to encode information in a second configuration (FIG. 2) may produce a different solution than respectively programming these two qubits to encode information in a first configuration (FIG. 1). In accordance with the present systems and methods, a quantum processor may be operated iteratively to examine a set of equivalent configurations (e.g., all equivalent configurations) and the best solution may be selected.

The purpose of FIG. 2 is to illustrate how a rotation of a first configuration can produce a second configuration that is equivalent to the first configuration. Similarly, a reflection of a first configuration may be used to produce an equivalent configuration.

Figure 3:
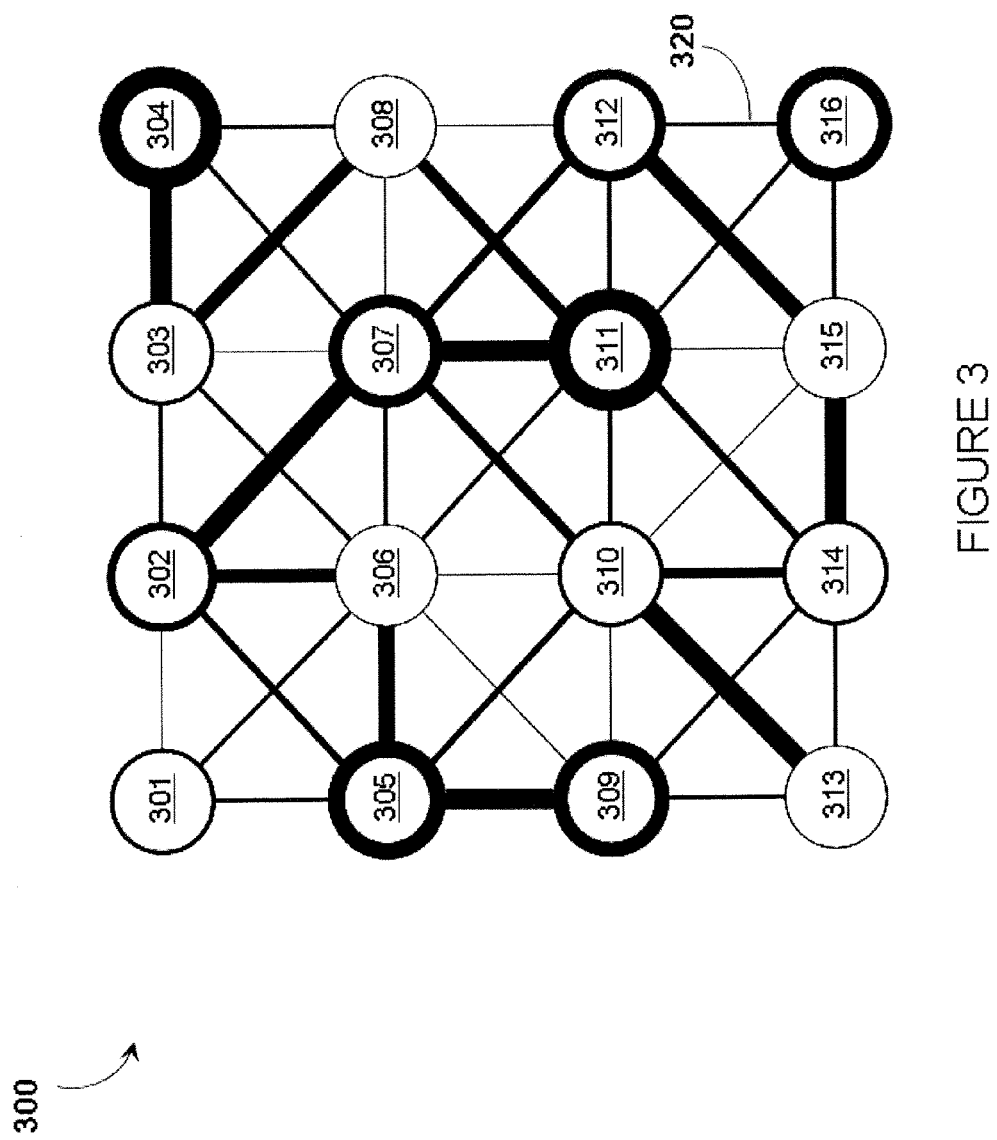
FIG. 3 is a schematic diagram of a quantum processor that is programmed in a third configuration in accordance with the present systems and methods.

FIG. 3 shows a quantum processor 300 that is programmed in a third configuration. Quantum processor 300 includes sixteen qubits 301-316 and forty-two couplers 320 (only one called out in the Figure) arranged in a nearest-neighbor plus next-nearest-neighbor coupling lattice architecture. Quantum processor 300 is substantially similar to quantum processor 100 from FIG. 1; the only difference being that quantum processor 300 is programmed in a third configuration while quantum processor 100 is programmed in a first configuration. In accordance with the present systems and methods, the first configuration shown in FIG. 1 and the third configuration shown in FIG. 3 are equivalent configurations of the same problem. Specifically, the third configuration illustrated in FIG. 3 embodies the first configuration of FIG. 1 reflected about a vertical axis parallel to a perimeter of the quantum processor, such that the information encoded in qubit 101 in the first configuration is encoded in qubit 304 in the third configuration, and so on. A vertical reflection is used here to illustrate how a first configuration and a third configuration may be equivalent to one another. Those of skill in the art will appreciate that similarly equivalent configurations may be achieved with the illustrated processor architecture using a horizontal reflection and/or a combination of a reflection and a rotation. Furthermore, different processor architectures may realize equivalent configurations by different reflections about different axes.

Those of skill in the art will appreciate that the number of available equivalent configurations, and the techniques by which equivalent configurations may be established, are highly dependent on the nature and architecture of the quantum processor being implemented. For example, the number of available equivalent configurations is influenced, at least in part, by the connectivity and coupling-scheme implemented in a quantum processor. A processor with high connectivity (i.e., each qubit is coupled to a large number of other qubits) may yield more equivalent configurations than a processor with low connectivity. Similarly, a processor with substantially uniform connectivity may yield more equivalent configurations than a processor with non-uniform or heterogeneous connectivity. For some processors, equivalent configurations may be produced using techniques other than rotation and/or reflection, such as, for example, by shifting all qubits over one position, shifting all qubits over two positions, and so on.

The purpose of FIGS. 1-3 is to show examples of equivalent configurations and to illustrate some techniques by which equivalent configurations may be established. In accordance with the present systems and methods, such equivalent configurations can be used to realize a degree of fault tolerance in quantum computing when operating physical quantum computing hardware that includes incongruent elements.

Figure 4:
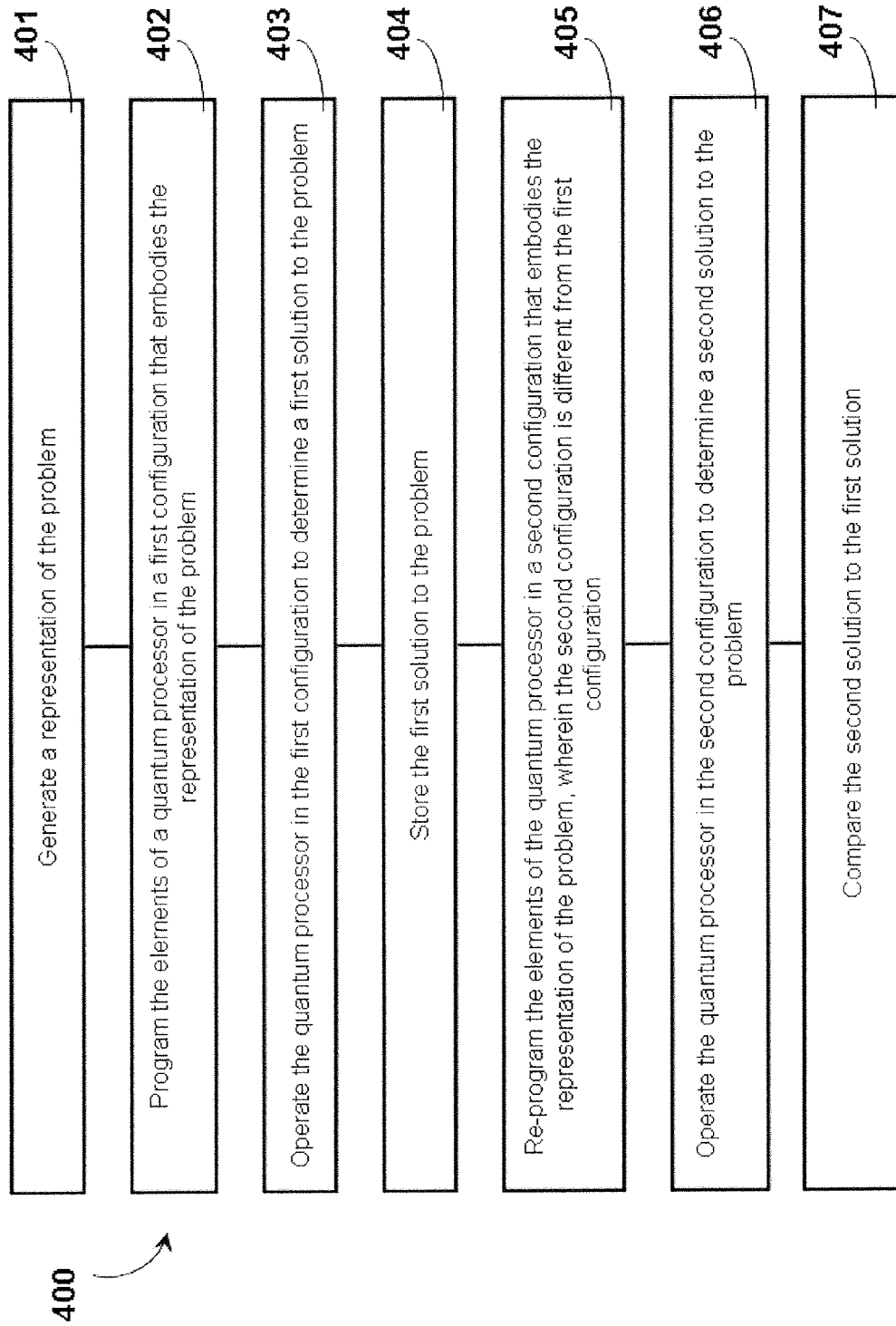
FIG. 4 is a flow-diagram of an embodiment of a method of using a quantum processor to determine a solution to a problem.

FIG. 4 shows a method 400 of using a quantum processor to determine a solution to a problem, according to one illustrated embodiment. Method 400 includes seven acts 401-407, though those of skill in the art will appreciate that in alternative embodiments additional acts or steps may be included or omitted in various applications of method 400. At 401, a representation of the problem is generated. The representation may include, for example, a graphical representation, a binary representation, a quadratic unconstrained binary optimization representation, an Ising model representation, and the like. In some embodiments, the representation of the problem may be generated using a computer processor, such as a classical digital computer processor. At 402, the elements of the quantum processor are programmed in a first configuration that embodies the representation of the problem. In some embodiments, this programming may be achieved using an operational subsystem including a plurality of element-specific programming interfaces. At 403, the quantum processor is operated in the first configuration to determine a first solution to the problem. Operating the quantum processor may include, for example, performing a quantum computation such as an adiabatic quantum computation or an implementation of quantum annealing. Determining a first solution to the problem may include reading out the first solution to the problem. In some embodiments, the quantum processor may include a read out subsystem configured to read out the first solution to the problem. At 404, the first solution to the problem is stored. In some embodiments, the first solution to the problem may be stored in a readable/writable memory of a computer processor, such as a classical digital computer processor. In some embodiments, a read out subsystem may be configured to store the first solution to the problem. At 405, the elements of the quantum processor are re-programmed in a second configuration that embodies the representation of the problem, where the second configuration is different from the first configuration. In some embodiments, the first and second configurations are both equivalent configurations of the same problem, such that the second configuration differs from the first configuration by having at least one element of the quantum processor programmed differently in the second configuration compared to the programming of the same element in the first configuration. At 406, the quantum processor is operated in the second configuration to determine a second solution to the problem, where operating the quantum processor may again include performing a quantum computation, such as an adiabatic quantum computation or an implementation of quantum annealing. Determining a second solution to the problem may include reading out the second solution to the problem. In some embodiments, the quantum processor may include a read out subsystem configured to read out the second solution to the problem. At 407, the second solution to the problem as determined in act 406 is compared to the first solution to the problem as determined in act 403. In some embodiments, fire first and second solutions are individually assessed in terms of at least one criterion to determine which of the two solutions best satisfies the at least one criterion. For example, the at least one criterion may include a measure of the accuracy of the solution, or any measure (depending on the nature of the problem) indicative of a quality of the solution. In some embodiments, the one of the first solution and the second solution that best satisfies the at least one criterion is returned as the preferred solution to the problem.

In some embodiments of method 400, acts 405-407 may be repeated for at least one additional equivalent configuration to determine at least one additional solution to the problem. In such embodiments, the act of determining a preferred solution by comparing each additional solution to the previous solution may be performed in each iteration, with the preferred solution being stored and the other solution (i.e., the solution that has not been identified as the preferred solution) being discarded. Alternatively, each additional solution may be stored until all of the solutions have been determined, and then the preferred solution may be determined by evaluating all of the stored solutions in terms of the at least one criterion.

Figure 5:
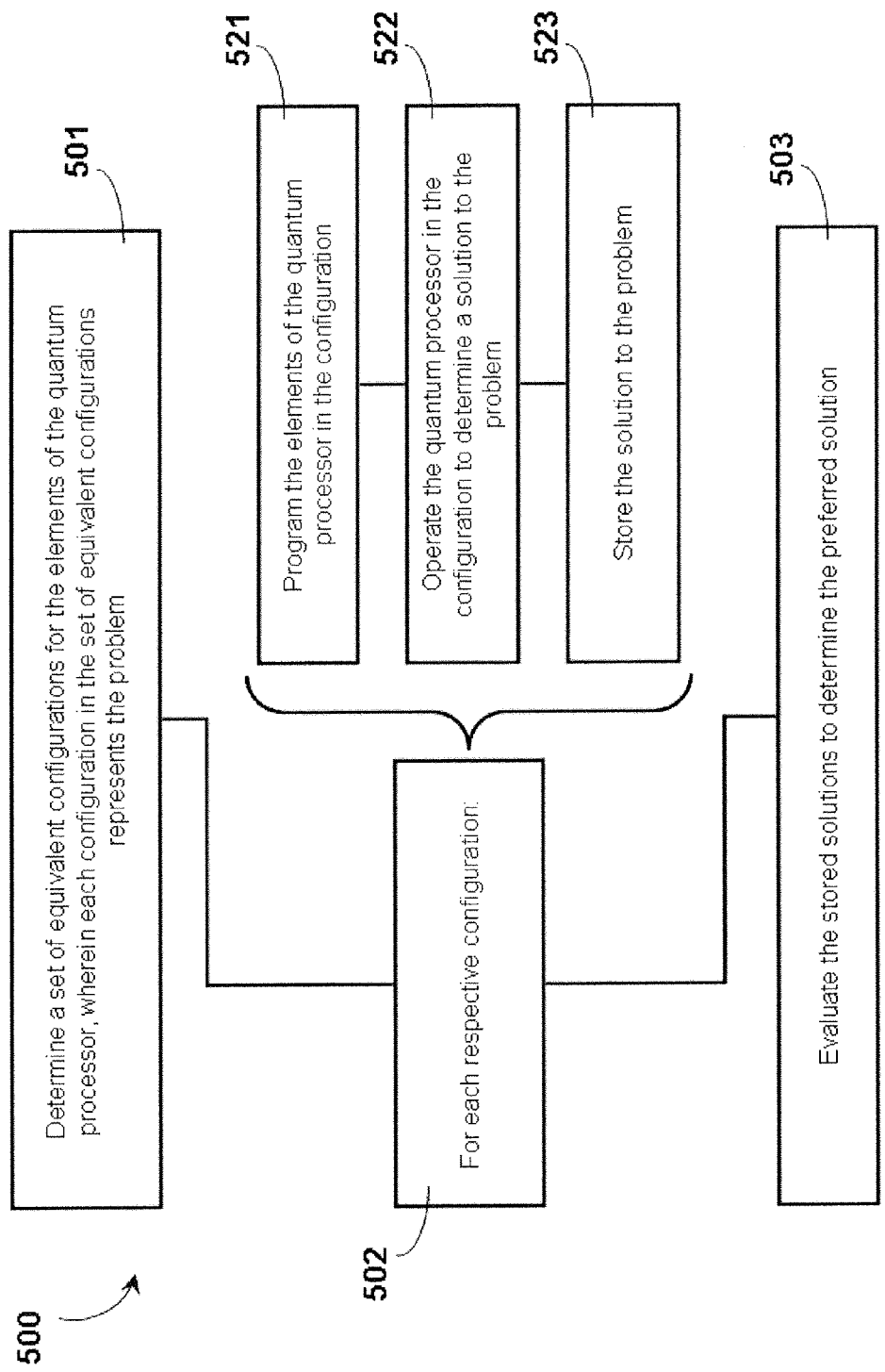
FIG. 5 is a flow-diagram of an embodiment of a method of using a quantum processor to determine a solution to a problem.

FIG. 5 shows a method 500 of using a quantum processor to determine a solution to a problem, according to one illustrated embodiment. Method 500 includes three main acts 501-503 and three sub-acts 521-523, though those of skill in the art will appreciate that in alternative embodiments additional acts or steps may be included or omitted in various applications of method 500. At 501, a set of equivalent configurations for the elements of the quantum processor is determined, where each configuration in the set of equivalent configurations represents the problem. In some embodiments, the set of equivalent configurations may be generated using a computer processor, such as a classical digital computer processor.

In method 500, act 502 represents the initiation of an iteration cycle comprising a set of sub-acts 521-523 performed using a quantum processor. At 502, a respective iteration of sub-acts 521-523 is performed for each configuration in the set of equivalent configurations determined in act 501. For each configuration, the elements of the quantum processor are programmed in the configuration at 521; the quantum processor is operated in the configuration to determine a solution to the problem at 522; and the solution to the problem is stored at 523. As previously described, the elements of the quantum processor may be programmed using, for example, an operational subsystem comprising a plurality of programming interfaces and operating the quantum processor may include performing a quantum computation, such as an adiabatic quantum computation or an implementation of quantum annealing. In some embodiments, storing the solutions at 523 may include storing the solutions using a readable/writable memory of a computer processor, such as a classical digital computer processor.

Act 502 of method 500 concludes when sub-acts 521-523 have been performed for each configuration in the set of equivalent configurations determined at 501. At this point, method 500 proceeds to act 503, where the set of stored solutions resulting from the multiple iterations of sub-act 523 are evaluated to determine the preferred solution. As previously described, the preferred solution may include the solution that best satisfies at least one criterion. For example, the at least one criterion may include a measure of the accuracy of the solution, or any measure (depending on the nature of the problem) indicative of a quality of the solution. In some embodiments, the at least one criterion may denote a solution that represents an average, mean or median of two or more solutions resulting from the respective configurations or iterations. For instance, a solution that is arrived at for the most configurations or iterations, or to which the solutions of the most configurations or iterations are closest or approach. In some embodiments, a quality of each solution may readily be evaluated and the preferred solution may be identified as the particular solution that most embodies or best achieves the quality, regardless of the number of configurations that produce that solution. For instance, a particular configuration may produce a particular solution that is preferred over any other solution produced by any other configuration. For example, in applications for which the problem being solved is an optimization problem, the preferred solution may be the particular solution that best satisfies the optimization objective, whether this particular solution is produced by a plurality of equivalent configurations or a single equivalent configuration. The quality of each solution to an optimization problem may readily be checked by evaluating the optimization objective for each solution. Thus, in some embodiments, the preferred solution need only appear once throughout a plurality of iterations; whereas in other embodiments, the preferred solution may be the solution that occurs most frequently among all the iterations.

Throughout this specification and the appended claims, the term "quantum processor" is used to generally describe a collection of qubits (e.g., qubits 101 and 102) and couplers (e.g., coupler 120). Similarly, the term "operational subsystem" is used to generally describe the programming elements included in a quantum processor and other associated control circuitry or instructions. As previously described, the programming elements of the operational subsystem may communicate with a programming system which may be separate from the quantum processor or included locally on the processor.

In accordance with the present systems and methods, the solution obtained when operating a quantum processor to solve a computational problem may be improved if the quantum processor is operated for a plurality of iterations with each iteration implementing a different equivalent configuration representing the same problem. Due to incongruities in the elements of a quantum processor (arising, for example, from physical, parametric, and/or environmental discrepancies), a particular configuration may produce a better solution than an equivalent configuration representing the same problem. Thus, this approach is particularly well-suited to reduce the negative impacts of incongruities in the elements of a quantum processor, thereby realizing a degree of fault tolerance in physical quantum computing hardware.

In a further aspect of the present systems and methods, the practical implementation of an adiabatic quantum processor in the presence of non-absolute zero temperature is described. As a specific embodiment, a quantum processor comprising superconducting flux qubits is considered. However, those of skill in the art will appreciate that the concepts embodied herein may be applied to other forms of quantum processors implementing other forms of qubits.

Adiabatic quantum computation (and, more generally, quantum annealing) may be implemented in a variety of different ways, but the end goal is generally the same: find a low-energy state, such as a ground state, of a system Hamiltonian where the system Hamiltonian encodes a computational problem and the low-energy state represents a solution to the computational problem. The system Hamiltonian may therefore be referred to as a "problem Hamiltonian." The exact form of the problem Hamiltonian may vary depending on the hardware upon which it is being implemented. As an example, a quantum processor comprising superconducting flux qubits may be used to embody a problem Hamiltonian substantially in the form of a 2-local Ising Hamiltonian given in equation 1:

$$H_P = \sum_{i=1}^{n} h_i \sigma_i^z + \sum_{i,j=1}^{n} J_{ij} \sigma_i^z \sigma_j^z. \tag{1}$$

Here, n represents the number of qubits, $\sigma_i^z$ is the Pauli Z-matrix for the $i^{th}$ qubit, and $h_i$ and $J_{ij}$ are dimensionless local fields coupled to each qubit. The $h_i$ terms in equation 1 may be physically realized by respectively coupling flux signals $\phi_x$ to the qubit loop of each $i^{th}$ qubit. The $J_{ij}$ terms in equation 1 may be physically realized by respectively coupling the qubit loops of pairs of qubits (qubits i and j, respectively) together with a coupling strength that is at least partially governed by an applied coupler flux bias $\phi_J$. Determining a low-energy state, such as a ground state, of the 2-local Ising Hamiltonian in equation 1 is known to be computationally difficult. Other problems may be mapped to the 2-local Ising Hamiltonian; thus, this Hamiltonian may be cast as the general problem Hamiltonian in a quantum processor that implements quantum annealing. To anneal the Hamiltonian described by equation 1, a disorder term may be added as previously described, thereby realizing an evolution Hamiltonian given by equation 2:

$$H_E = \sum_{i=1}^{n} h_i \sigma_i^z + \sum_{i,j=1}^{n} J_{ij} \sigma_i^z \sigma_j^z + \sum_{i=1}^{n} \Delta_i \sigma_i^x, \quad (2)$$

where $\sigma_i^x$ is the Pauli X-matrix for the $i^{th}$ qubit and $\Delta_i$ is the single qubit tunnel splitting induced in the $i^{th}$ qubit. During annealing, the tunnel splitting $\Delta_i$ is gradually removed until only the problem Hamiltonian given by equation 1 remains. A brief description of how quantum annealing of the 2-local Ising Hamiltonian may be realized using a quantum processor comprising superconducting flux qubits is now provided.

Figure 6:
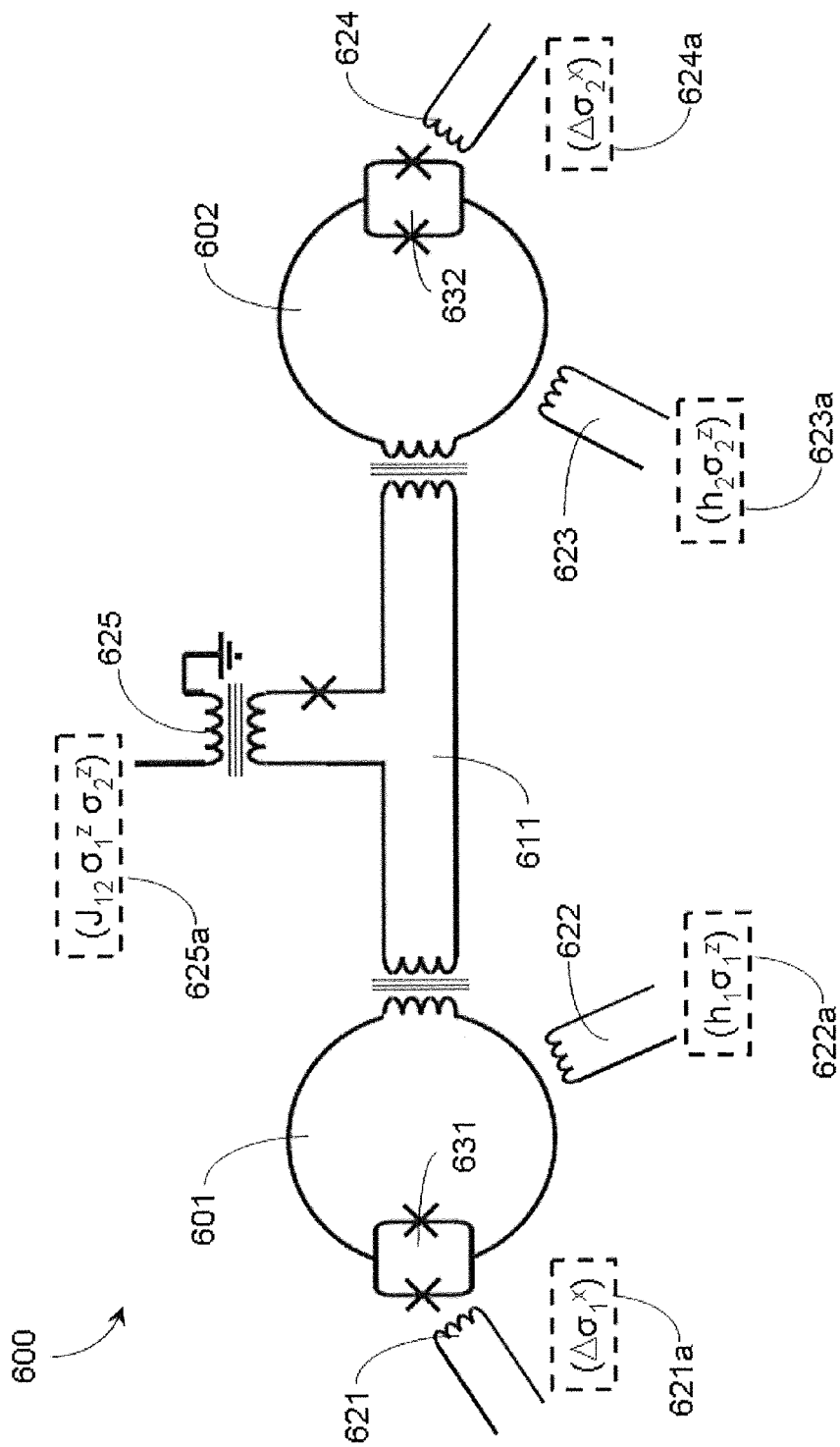
FIG. 6 is a schematic diagram of a portion of a conventional superconducting quantum processor designed for quantum annealing. (and/or adiabatic quantum computation).

FIG. 6 is a schematic diagram of a portion of a conventional superconducting quantum processor 600 designed for quantum annealing (and/or adiabatic quantum computation). The portion of superconducting quantum processor 600 shown in FIG. 6 includes two superconducting flux qubits 601, 602 and a tunable ZZ-coupler 611 coupling information therebetween. While the portion of quantum processor 600 shown in FIG. 6 includes only two qubits 601, 602 and one coupler 611, those of skill in the art will appreciate that the full quantum processor 600 may include any number of qubits, and any number of coupling devices coupling information therebetween.

The portion of quantum processor 600 shown in FIG. 6 may be implemented to physically realize the Hamiltonians described by equation 1 and equation 2. In order to provide the $\sigma^z$ and $\sigma^x$ terms in these Hamiltonians, quantum processor 600 includes programming interfaces 621-625 that are used to configure and control the state of quantum processor 600. Throughout this specification and the appended claims, the term "programming interface" is used to refer to a structure that is operable to couple programming and/or control signals to a specific device or component of a quantum processor. In the illustrated embodiment, each of programming interfaces 621-625 is realized by a respective inductive coupling structure that is controlled by a programming system (not shown). Such a programming system may be programmed using an operational subsystem that separate from quantum processor 600, or an operational subsystem that is included locally (i.e., on-chip with quantum processor 600) as described in US Patent Publication 2008-0215850.

In the operation of quantum processor 600, programming interfaces 621 and 624 may each be used to couple a respective flux signal $\phi_{CJJ}$ into a respective compound Josephson junction 631, 632 of qubits 601 and 602, thereby realizing the $\Delta_i$ terms in the system Hamiltonian. This coupling provides the $\sigma^x$ terms of equation 2. Similarly, programming interfaces 622 and 623 may each be used to couple a respective flux signal $\Phi_X$ into a respective qubit loop of qubits 601 and 602, thereby realizing the $h_i$ terms in the system Hamiltonian. This coupling provides the $\sigma^z$ terms of equations 1 and 2. Programming interface 625 may be used to control the coupling between qubits 601 and 602 through coupler 611, thereby realizing the terms in the system Hamiltonian. This coupling provides the $\sigma^z \sigma^z$ terms of equations 1 and 2. In FIG. 6, an exemplary contribution of each of programming interfaces 621-625 to the system Hamiltonian is indicated in boxes 621a-625a, respectively.

A small-scale, two-qubit quantum annealing computation may be performed using the portion of quantum processor 600 shown in FIG. 6. The problem Hamiltonian described by equation 1 may be realized by using programming interfaces 622 and 623 to establish the $h_i \sigma^z$ terms and coupler 611, as controlled by programming interface 625, to establish the $J_{12} \sigma^z \sigma^z$ term. During annealing, the disorder term $\Gamma H_D$ may be realized by using programming interfaces 621 and 624 to establish the $\Delta_i \sigma^x$ terms. This induces tunnel splitting in qubits 601 and 602. As the system evolves, the $\Delta_i \sigma^x$ terms established by programming interfaces 621 and 624 may be gradually removed such that, at the end of the annealing process, only the terms that define equation 1 remain.

As previously described, most theoretical development of adiabatic quantum computation and quantum annealing has, to date, been restricted to an idealized model operated at absolute zero temperature. In accordance with an aspect of the present systems and methods, the operation of a system designed for adiabatic quantum computation and/or quantum annealing (hereinafter generalized as "quantum annealing") may be adapted to accommodate thermodynamic effects at non-absolute zero temperature.

A prominent effect of quantum annealing on a processor operated at non-absolute zero temperature is a resulting thermal distribution of the processor states. That is, thermodynamic effects can influence the final state in which the system settles at the end of an evolution, even if the evolution satisfies the adiabatic condition. In some embodiments, the resulting thermal distribution of the processor states may substantially align (i.e., within reasonable bounds of uncertainty) with the probability distribution given by equation (3):

$$P_i = \frac{e^{-E_i/k_B T}}{\sum_i e^{-E_i/k_B T}} \quad (3)$$

where $P_i$ is the probability that the system will settle into the $i^{th}$ state, $E_i$ is the energy of the $i^{th}$ state, $k_B$ is the Boltzmann constant, and T is the system temperature. The ground state of the system (for which let i=G) is the state with the lowest energy, $E_G$. Equation 3 describes a thermal distribution for which $P_i$ decreases as $E_i$ increases. It follows, then, that the ground state, which has the lowest energy $E_G$ among all the i states, may typically be the most probable state in a thermal distribution.

A consequence of the thermodynamic probability distribution described in equation 3 is that the probability of the system settling into the ground state is always less than 1 when operating at non-absolute zero temperature. In accordance with an aspect of the present systems and methods, it is therefore advantageous to run multiple iterations of a quantum annealing algorithm to improve the likelihood of obtaining the ground state as a solution.

Figure 7:
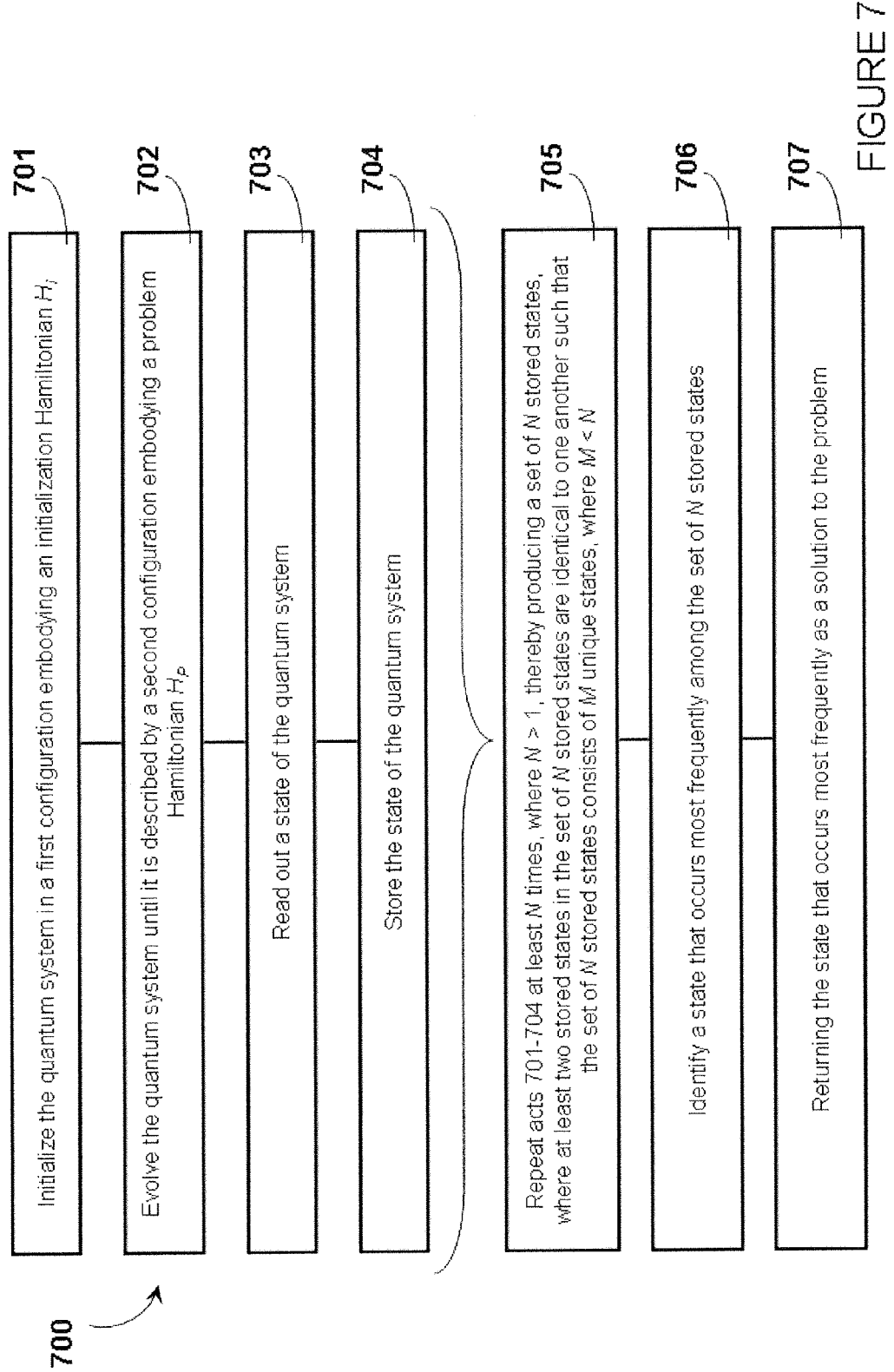
FIG. 7 is a flow-diagram of a method for solving a problem using a quantum system comprising a plurality of qubits in accordance with an embodiment of the present systems and methods.

FIG. 7 is a flow-diagram of a method 700 for solving a problem using a quantum system comprising a plurality of qubits. Method 700 includes seven acts 701-707, though those of skill in the art will appreciate that in alternative embodiments additional acts or steps may be included or omitted in various applications of method 700. At 701, the quantum system is initialized in a first configuration embodying an initialization Hamiltonian $H_i$. The initialization Hamiltonian $H_i$ may, for example, be similar to the Hamiltonian described in equation 2 and the initialization procedure may be similar to that described in the context of FIG. 6. At 702, the quantum system is evolved until it is described by a second configuration embodying a problem Hamiltonian $H_P$. The problem Hamiltonian $H_P$ may, for example, be similar to the Hamiltonian described in equation 1 and the evolution procedure may be similar to that described in the context of FIG. 6. At 703, a state of the quantum system is read out. In some embodiments, this may include reading out the state of each qubit in the quantum system. At 704, the state of the quantum system that is read out in act 703 is stored. The state of the system may be stored, for example, in a computer-readable medium. At 705, acts 701-704 are repeated for a number N of iterations, where N>1, thereby producing a set of N stored states, where at least two stored states in the set of N stored states are identical to one another such that the set of N stored states consists of M unique states, where M<N. At 706, a state that occurs most frequently among the set of N stored states is identified. The state that occurs most frequently may be identified, for example, using a computer processor, such as a classical digital computer processor. In some embodiments, a probability distribution describing the number of occurrences of each of the M unique states in the set of N stored states may be generated using the computer processor. In such embodiments, a state that occurs most frequently among the set of N stored states may be identified as the state having a highest probability in the probability distribution. At 707, the state identified in act 706 is returned as a solution to the problem.

In some embodiments, the problem Hamiltonian $H_P$ may include a ground state, and the state that occurs most frequently among the set of N stored states may correspond to the ground state. In some embodiments, the problem Hamiltonian $H_P$ may include a ground state, a first excited state, and a second excited state, and the state that occurs most frequently among the set of N stored states may correspond to one of the ground state, the first excited state, and the second excited state.

While the ground state may, thermodynamically speaking, be the most probable state of the quantum processor at the end of an adiabatic evolution, a finite number of low-energy excited states (i.e., excited states that are close in energy to the ground state) may each exhibit a "statistically significant" probability of being the final state into which the system settles. The "statistical significance" of the probability of the system settling in a particular low-energy excited state may depend, at least in part, on the difference between the energy of the excited state $E_X$ and the energy of the ground state $E_G$. The probability of the system settling in a particular excited state may be considered "statistically significant" if the energy $E_X$ of the particular excited state satisfies the condition:

$$E_X - E_G < \Delta E$$

where $\Delta E$ is some energy threshold. A majority of low-energy excited states will typically be found within a broad energy threshold of $\Delta E = 100 k_B T$. However, most low-energy states with a significant probability of being the final state into which the system settles will be found within a much smaller energy threshold. For example, an energy threshold of $\Delta E = 3 k_B T$ may ensure that each excited state with $\Delta E$ of the ground state energy $E_G$ has a greater than 5% probability of being the final state into which the system settles. Thus, in some embodiments, for a quantum processor operated at a non-absolute zero temperature T, there is a 95% probability that the state into which the system settles after an adiabatic evolution will be either the ground state or an excited state having energy $E_X$ in the range $E_G < E_X < E_G + 3 k_B T$. The higher the number of iterations N, the more likely it is that the highest-probability state will manifest itself as the most frequently occurring state. It follows that the state that occurs the most frequently among the set of N stored states may reasonably be expected to correspond to either the ground state or at least one of the excited energy states from the set of excited energy states. In many applications, a low-energy excited state having energy $E_X$ in the range $E_G < E_X < E_G + 3 k_B T$ may represent a satisfactory solution to the problem.

Those of skill in the art will appreciate, however, that an energy threshold $\Delta E$ that is either greater or lesser than $3 k_B T$ may be enforced depending on the nature of the specific application.

In accordance with the present systems and methods, method 700 may be employed using a problem-solving system comprising a quantum processor, an operational subsystem for configured to enable acts 701 and 702, a readout subsystem configured to enable act 703, and a computer processor configured to enable acts 704 and 706-707. An example of an appropriate computer processor is a classical digital computer processor.

Method 700 describes a first approach to improving the likelihood of obtaining the ground state in an implementation of quantum annealing. Method 700 relies on the presence of recurring states in the set of N stored states, because thermodynamic effects can result in the ground state being the most recurring state. However, the advantages of repeating a quantum annealing operation for multiple iterations can be realized completely independently of whether or not are recurring states in the set of N stored states.

Figure 8:
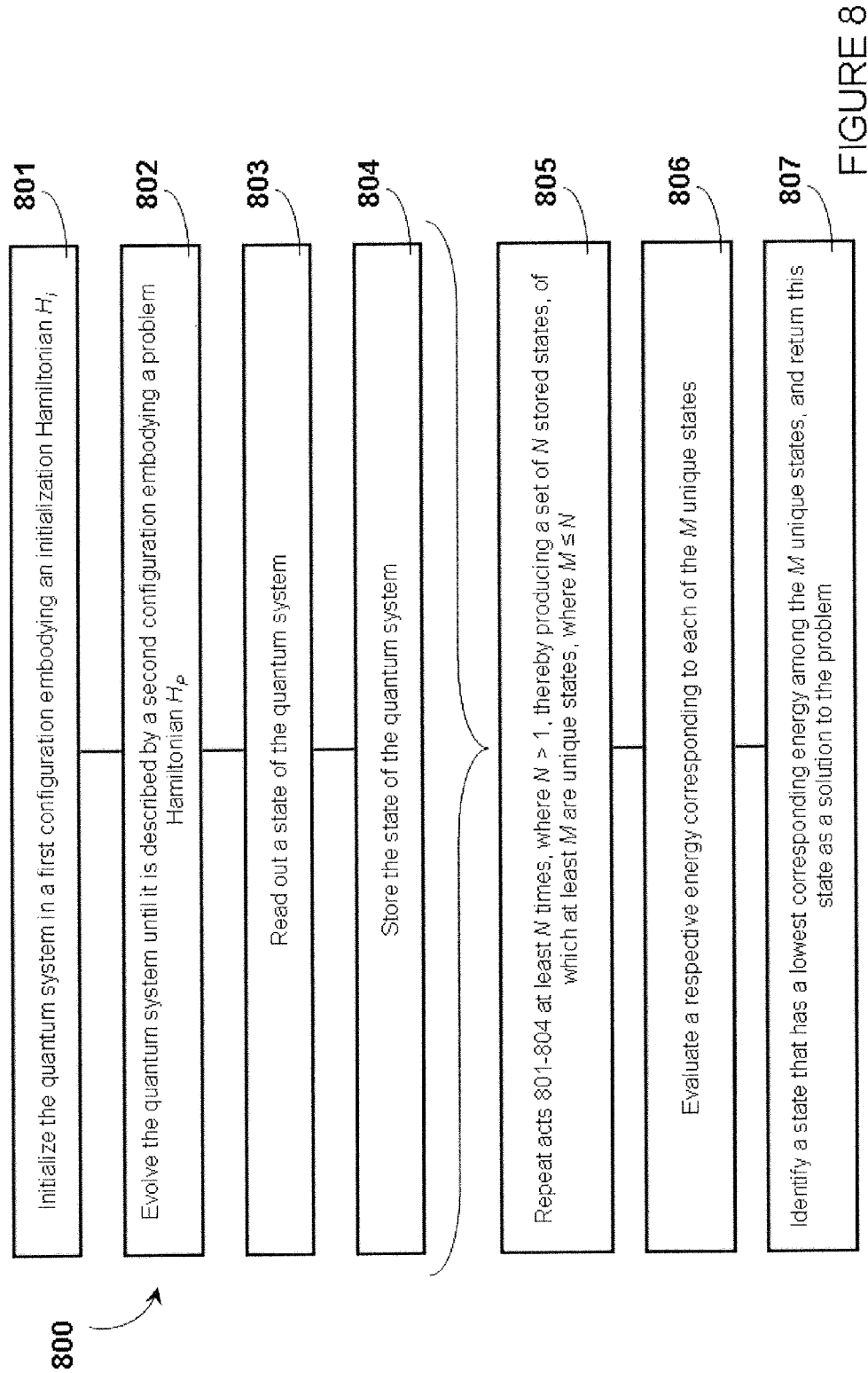
FIG. 8 is a flow-diagram of a method for solving a problem using a quantum system comprising a plurality of qubits in accordance with another embodiment of the present systems and methods.

FIG. 8 is a flow-diagram of a method 800 for solving a problem using a quantum system comprising a plurality of qubits. Method 800 includes seven acts 801-807, though those of skill in the art will appreciate that in alternative embodiments additional acts or steps may be included or omitted in various applications of method 800. Acts 801-804 are similar to acts 701-704, respectively, of method 700 as previously described. At 805, acts 801-804 are repeated for a number N of iterations, where N>1, thereby producing a set of N stored states, of which at least M are unique states, where M≦N. At 806, the respective energy corresponding to each of the M unique states is evaluated. These energies may be evaluated, for example, using a computer processor, such as a classical digital computer processor. At 807, the state that has the lowest corresponding energy among the M unique states is identified and returned as a solution to the problem. In some embodiments, a computer processor may be used to identify the state that has the lowest corresponding energy.

In some embodiments, the problem Hamiltonian $H_P$ may include a ground state, and the state that has the lowest corresponding energy among the set of M unique states may be the ground state. In some embodiments, the problem Hamiltonian $H_P$ may include a ground state, a first excited state, and a second excited state, and the state that has the lowest corresponding energy among the set of M unique states may be one of the ground state, the first excited state, and the second excited state. In embodiments explicitly operated at non-absolute zero temperature T, the problem Hamiltonian $H_P$ may include a ground state having an energy $E_G$ and a set of excited energy states each having a respective energy $E_X$ in the range $E_G < E_X < E_G + 3 k_B T$. In such embodiments, the state that has the lowest corresponding energy among the M unique states may correspond to one of the excited energy states from the set of excited energy states.

In accordance with the present systems and methods, method 800 may be employed using a problem-solving system comprising a quantum processor, an operational subsystem for configured to enable acts 801 and 802, a readout subsystem configured to enable act 803, and a computer processor configured to enable acts 804 and 806-807. An example of an appropriate computer processor is a classical digital computer processor.

In accordance with the present systems and methods, the various embodiments described herein may be implemented on their own or in combination. For example, methods 700 and 800 both require multiple iterations, where each iteration involves evolving a quantum system until it is described by a configuration that embodies the same problem Hamiltonian. In some embodiments, it may be advantageous to incorporate the teachings of methods 400 and 500 into methods 700 and 800 by utilizing different equivalent configurations in at least some successive iterations. In some embodiments, evolving the quantum system until the quantum system is described by a second configuration embodying a problem Hamiltonian $H_P$ includes evolving the quantum system until the quantum system is described by one of a plurality of second configurations, wherein each second configuration in the plurality of second configurations represents a different embodiment of the same problem Hamiltonian $H_P$.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and methods of quantum computation, not necessarily the exemplary systems and methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/220,860, filed Jun. 26, 2009 and entitled "Systems and Methods for Realizing Fault Tolerance in Physical Quantum Computing Hardware,". U.S. Provisional Patent Application Ser. No. 61/239,917, filed Sep. 4, 2009 and entitled "Systems and Methods for Adiabatic Quantum Computation in the Presence of Non-Absolute Zero Temperature," US Patent Publication No. 2006-0225165 (now U.S. Pat. No. 7,533,068), US Patent Publication 2008-0176750, U.S. patent application Ser. No. 12/266,378 published as U.S. Patent Publication 2009-0121215, PCT Patent Application Ser. No. PCT/US09/37984 published as PCT Patent Publication 2009-120638, U.S. Pat. No. 7,135,701, and US Patent Publication 2008-0215850 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of using a quantum processor to determine a solution to a problem, wherein the quantum processor comprises a plurality of elements, the method comprising:
   generating a representation of the problem using a first computer processor;
   programming the elements of the quantum processor in a first configuration that embodies the representation of the problem;
   operating the quantum processor in the first configuration to determine a first solution to the problem;
   storing the first solution to the problem;
   programming the elements of the quantum processor in a second configuration that embodies the representation of the problem, wherein the second configuration is different from the first configuration such that at least one element of the quantum processor is programmed differently in the second configuration compared to the first configuration;
   operating the quantum processor in the second configuration to determine a second solution to the problem;
   storing the second solution to the problem;
   programming the elements of the quantum processor in at least one additional configuration that embodies the representation of the problem, wherein the at least one additional configuration is different from both the first configuration and the second configuration; and
   operating the quantum processor in the at least one additional configuration to determine at least one additional solution to the problem.

2. The method of claim 1 wherein operating the quantum processor includes performing at least one of an adiabatic quantum computation and an implementation of quantum annealing.

3. The method of claim 1 wherein the second configuration includes at least one of a rotation of the first configuration and a reflection of the first configuration.

4. The method of claim 1, further comprising:
   determining a first preferred solution to the problem by comparing the second solution to the first solution, wherein the first preferred solution to the problem includes the one of the first solution and the second solution that best satisfies at least one criterion.

5. The method of claim 4, further comprising:
   storing the first preferred solution to the problem; and
   determining a second preferred solution to the problem by comparing the at least one additional solution to the first preferred solution, wherein the second preferred solution to the problem includes the one of the at least one additional solution and the first preferred solution that best satisfies the at least one criterion.

6. The method of claim 1, further comprising:
   determining a preferred solution to the problem by comparing the first solution, the second solution, and the at least one additional solution, wherein the preferred solution to the problem includes the one of the first solution, the second solution, and the at least one additional solution that best satisfies at least one criterion.

7. A processor system comprising:
   a quantum processor comprising a plurality of elements, wherein the quantum processor includes a superconducting quantum processor and at least one element is selected from the group consisting of a superconducting flux qubit, a superconducting charge qubit, a superconducting phase qubit, and a superconducting coupler;
   an operational subsystem including a plurality of programming interfaces operable to program the plurality of elements, the operational subsystem configured to program the plurality of elements of the quantum processor in a first configuration that embodies a problem, operate the quantum processor in the first configuration to determine a first solution to the problem, program the plurality of elements of the quantum processor in a second configuration that embodies the problem, wherein the second configuration is different from the first configuration such that at least one element of the quantum processor is programmed differently in the second configuration compared to the first configuration, and operate the quantum processor in the second configuration to determine a second solution to the problem; and a read out subsystem configured to read out the first solution to the problem, store the first solution to the problem, and read out the second solution to the problem.

8. A method of operating a quantum processor, the method comprising:

programming the quantum processor in a first configuration that embodies a problem;

performing a first quantum computation using the quantum processor programmed in the first configuration to determine a first solution to the problem;

storing the first solution to the problem;

programming the quantum processor in a second configuration that embodies the problem, wherein the second configuration is different from the first configuration;

performing a second quantum computation using the quantum processor programmed in the second configuration to determine a second solution to the problem; and determining a first preferred solution to the problem by comparing the second solution to the first solution, wherein the first preferred solution to the problem includes the one of the first solution and the second solution that best satisfies at least one criterion.

9. The method of claim 8 wherein performing a first quantum computation includes performing at least one of an adiabatic quantum computation and an implementation of quantum annealing, and wherein performing a second quantum computation includes performing at least one of an adiabatic quantum computation and an implementation of quantum annealing.

10. The method of claim 8 wherein programming the quantum processor in a second configuration that embodies the problem includes programming the quantum processor in the second configuration that includes at least one of a rotation of the first configuration and a reflection of the first configuration.

11. The method of claim 8, further comprising:

storing the first preferred solution to the problem;

programming the quantum processor in at least one additional configuration that embodies the problem, wherein the at least one additional configuration is different from both the first configuration and the second configuration;

performing at least one additional quantum computation using the quantum processor programmed in the at least one additional configuration to determine at least one additional solution to the problem; and determining a second preferred solution to the problem by comparing the at least one additional solution to the first preferred solution, wherein the second preferred solution to the problem includes the one of the at least one additional solution and the first preferred solution that best satisfies at least one criterion.

12. The method of claim 8, further comprising:

storing the second solution to the problem;

programming the quantum processor in at least one additional configuration that embodies the problem, wherein the at least one additional configuration is different from both the first configuration and the second configuration; and performing at least one additional quantum computation using the quantum processor programmed in the at least one additional configuration to determine at least one additional solution to the problem.

13. The method of claim 12, wherein determining a first preferred solution to the problem includes determining a first preferred solution to the problem by comparing the first solution, the second solution, and the at least one additional solution, wherein the first preferred solution to the problem includes the one of the first solution, the second solution, and the at least one additional solution that best satisfies the at least one criterion.

14. A processor system comprising:

a quantum processor, wherein the quantum processor includes a superconducting quantum processor having at least one element selected from the group consisting of a superconducting flux qubit, a superconducting charge qubit, a superconducting phase qubit, and a superconducting coupler;

an operational subsystem including a plurality of programming interfaces operable to program the quantum processor, the operational subsystem configured to program the quantum processor in a first configuration that embodies a problem, perform a first quantum computation using the quantum processor programmed in the first configuration to determine a first solution to the problem, program the quantum processor in a second configuration that embodies the problem, wherein the second configuration is different from the first configuration, and perform a second quantum computation using the quantum processor programmed in the second configuration to determine a second solution to the problem; and a read out subsystem configured to read out the first solution to the problem, store the first solution to the problem, and read out the second solution to the problem.

15. A method of using a quantum processor to determine a solution to a problem, wherein the quantum processor comprises a plurality of elements, the method comprising:

determining a set of at least two equivalent configurations for the elements of the quantum processor, wherein each configuration in the set of equivalent configurations represents the problem, and wherein at least one configuration in the set of equivalent configurations includes at least one of a rotation of at least one other configuration in the set of equivalent configurations and a reflection of at least one other configuration in the set of equivalent configurations; and for each respective configuration:

programming the elements of the quantum processor in the configuration;

operating the quantum processor in the configuration to determine a solution to the problem; and storing the solution to the problem.

16. The method of claim 15, further comprising:

determining a preferred solution to the problem, wherein the preferred solution includes the solution that best satisfies at least one criterion.

17. The method of claim 15 wherein operating the quantum processor includes performing at least one of an adiabatic quantum computation and an implementation of quantum annealing.

18. A processor system comprising:

a quantum processor comprising a plurality of elements, wherein the quantum processor includes a superconducting quantum processor having at least one element selected from the group consisting of a superconducting flux qubit, a superconducting charge qubit, a superconducting phase qubit, and a superconducting coupler;

an operational subsystem including a plurality of programming interfaces operable to program the plurality of elements, the operational subsystem configured to iteratively operate the quantum processor by, for each iteration, programming the elements of the quantum processor in a respective configuration from a set of equivalent configurations that represent a problem, and performing a quantum computation to determine a respective solution to the problem corresponding to each respective configuration; and
a read out subsystem configured to read out and store each respective solution to the problem.

19. A method for solving a problem using a quantum system that includes a plurality of qubits, the method comprising:
A) initializing the quantum system in a first configuration embodying an initialization Hamiltonian $H_i$;
B) evolving the quantum system until the quantum system is described by a second configuration embodying a problem Hamiltonian $H_p$;
C) reading out a state of the quantum system;
D) storing the state of the quantum system in a non-transitory computer-readable medium;
E) repeating acts A) through D) at least N times, where N>1, to produce a set of N stored states, wherein at least two of the stored states in the set of N stored states are identical to one another such that the set of N stored states consists of M unique states, where M<N;
F) identifying a state that occurs most frequently among the set of N stored states using a computer processor; and
G) returning the state that occurs most frequently as a solution to the problem.

20. The method of claim 19, further comprising:
generating a probability distribution describing the number of occurrences of each of the M unique states in the set of N stored states using the computer processor, wherein identifying a state that occurs most frequently among the set of N stored states includes identifying a state having a highest probability in the probability distribution.

21. The method of claim 19 wherein the problem Hamiltonian $H_p$ includes a ground state, and wherein the state that occurs most frequently among the set of N stored states corresponds to the ground state.

22. The method of claim 19 wherein evolving the quantum system includes evolving the quantum system at a non-absolute zero temperature T, and wherein the problem Hamiltonian $H_p$ includes a ground state having an energy $E_G$ and a set of excited energy states each having a respective energy $E_X$ in the range $E_G<E_X<E_G+100k_BT$, and wherein the state that occurs most frequently among the set of N stored states corresponds to one of the excited energy states from the set of excited energy states.

23. The method of claim 19 wherein evolving the quantum system includes evolving the quantum system at a non-absolute zero temperature T, and wherein the problem Hamiltonian $H_p$ includes a ground state having an energy $E_G$ and a set of excited energy states each having a respective energy $E_X$ in the range $E_G<E_X<E_G+3k_BT$, and wherein the state that occurs most frequently among the set of N stored states corresponds to one of the excited energy states from the set of excited energy states.

24. The method of claim 19 wherein the problem Hamiltonian $H_p$ includes a ground state, a first excited state, and a second excited state, and wherein the state that occurs most frequently among the set of N stored states corresponds to one of the ground state, the first excited state, and the second excited state.

25. The method of claim 19 wherein evolving the quantum system until the quantum system is described by a second configuration embodying a problem Hamiltonian $H_p$ includes evolving the quantum system until the quantum system is described by one of a plurality of second configurations, wherein each second configuration in the plurality of second configurations represents a different embodiment of the same problem Hamiltonian $H_p$.

26. A problem-solving system comprising:
a quantum processor comprising a plurality of elements;
an operational subsystem including a plurality of programming interfaces operable to program the plurality of elements, the operational subsystem configured to:
  initialize the quantum processor in a first configuration embodying an initialization Hamiltonian $H_i$;
  evolve the quantum processor until the quantum system is described by a second configuration embodying a problem Hamiltonian $H_p$; and
  repeat the initialization and evolution of the quantum processor for at least N iterations, where N>1;
a read out subsystem configured to read out a state of the quantum processor in a second configuration for each of the N iterations; and
a computer processor configured to:
  store the state of the quantum processor for each of the N iterations, thereby producing a set of N stored states, wherein at least two stored states in the set of N stored states are identical to one another such that the set of N stored states consists of M unique states, where M<N;
  identify a state that occurs most frequently among the set of N stored states; and
  return the state that occurs most frequently.

27. The problem-solving system of claim 26 wherein the quantum processor is a superconducting quantum processor comprising superconducting qubits.

28. A method for solving a problem using a quantum system comprising a plurality of qubits, the method comprising:
initializing the quantum system in a first configuration embodying an initialization Hamiltonian $H_i$;
evolving the quantum system until it is described by a second configuration embodying a problem Hamiltonian $H_p$;
reading out a state of the quantum system;
storing the state of the quantum system in a non-transitory computer-readable medium;
repeating the initializing the quantum system, the evolving the quantum system, the reading out the state of the quantum system and the storing the state of the quantum system at least N times, where N>1, thereby producing a set of N stored states, of which at least M are unique states, where M<N;
evaluating a respective energy corresponding to each of the M unique states using a computer processor;
identifying a state that has a lowest corresponding energy among the M unique states; and
returning the state that has the lowest corresponding energy as a solution to the problem.

29. The method of claim 28 wherein the problem Hamiltonian $H_p$ includes a ground state, and wherein the state that has the lowest corresponding energy among the M unique states corresponds to the ground state.

30. The method of claim 28 wherein evolving the quantum system includes evolving the quantum system at a non-absolute zero temperature T, and wherein the problem Hamiltonian $H_p$ includes a ground state having an energy $E_G$ and a set of excited energy states each having a respective energy $E_X$ in the range $E_G<E_X<E_G+100k_BT$, and wherein the state that has the lowest corresponding energy among the M unique states corresponds to one of the excited energy states from the set of excited energy states.

31. The method of claim 28 wherein evolving the quantum system includes evolving the quantum system at a non-absolute zero temperature T, and wherein the problem Hamiltonian $H_p$ includes a ground state having an energy $E_G$ and a set of excited energy states each having a respective energy $E_X$ in the range $E_G < E_X < E_G + 3k_B T$, and wherein the state that has the lowest corresponding energy among the M unique states corresponds to one of the excited energy states from the set of excited energy states.

32. The method of claim 28 wherein the problem Hamiltonian $H_p$ includes a ground state, a first excited state, and a second excited state, and wherein the state that has the lowest corresponding energy among the M unique states corresponds to one of the ground state, the first excited state, and the second excited state.

33. The method of claim 28 wherein evolving the quantum system until the quantum system is described by a second configuration embodying a problem Hamiltonian $H_p$ includes evolving the quantum system until it is described by one of a plurality of second configurations, wherein each second configuration in the plurality of second configurations represents a different embodiment of the same problem Hamiltonian $H_p$.

34. A problem-solving system comprising:
a quantum processor comprising a plurality of elements;
an operational subsystem including a plurality of programming interfaces operable to program the plurality of elements, the operational subsystem configured to:
  initialize the quantum processor in a first configuration embodying an initialization Hamiltonian $H_i$;
  evolve the quantum processor until it is described by a second configuration embodying a problem Hamiltonian $H_p$; and
  repeat the initialization and evolution of the quantum system for at least N iterations, where N>1;
a read out subsystem configured to read out a state of the quantum processor in a second configuration for each of the N iterations; and
a computer processor configured to:
  store the state of the quantum processor for each of the N iterations, thereby producing a set of N stored states, of which at least M are unique states, where $M \leq N$;
  evaluate a respective energy corresponding to each of the M unique states;
  identify a state that has a lowest corresponding energy among the M unique states; and
  return the state that has the lowest corresponding energy.

35. The problem-solving system of claim 34 wherein the quantum processor is a superconducting quantum processor comprising superconducting qubits.

* * * * *